United States Patent [19]

Murakami et al.

[11] Patent Number: 4,811,057
[45] Date of Patent: Mar. 7, 1989

[54] LIGHT SOURCE ASSEMBLY FOR USE WITH AN ELECTROPHOTOGRAPHIC COPYING APPARATUS

[75] Inventors: Hajime Murakami, Kusatsu; Tooru Takenouchi; Hiroo Ikeura, both of Wakayama, all of Japan

[73] Assignees: Noritsu Koki Co., Ltd., Wakayama; Ishihara Sangyo Kaisha, Ltd., Osaka, both of Japan

[21] Appl. No.: 108,668

[22] Filed: Oct. 15, 1987

[30] Foreign Application Priority Data

Oct. 16, 1986 [JP] Japan .................. 61-159918

[51] Int. Cl.⁴ .............................................. G03B 27/72
[52] U.S. Cl. .................................................. 355/71
[58] Field of Search ................ 355/67, 71, 8, 14 E

[56] References Cited

U.S. PATENT DOCUMENTS

4,171,905 10/1979 Boschet .......................... 355/71
4,232,964 11/1980 Nodov et al. .................. 355/8 X

FOREIGN PATENT DOCUMENTS

60-233634 11/1985 Japan ............................. 355/71

Primary Examiner—L. T. Hix
Assistant Examiner—D. Rutledge
Attorney, Agent, or Firm—Armstrong, Nikaido, Marmelstein & Kubovcik

[57] ABSTRACT

A lamp unit for use in an electrophotographic copying apparatus. The lamp unit containing a lamp moves under an original on the original support. The lamp unit is formed with a slit through which the light from the lamp is shed on to the original and is reflected by it on to a photosensitive object to form an image thereon. The slit is the narrowest at its center and gradually widens toward its both ends. Also, the lamp unit is accelerated until it reaches the center of the original support and is decelerated thereafter. This assures a uniform distribution of light over the surface of a photosensitive object.

4 Claims, 2 Drawing Sheets

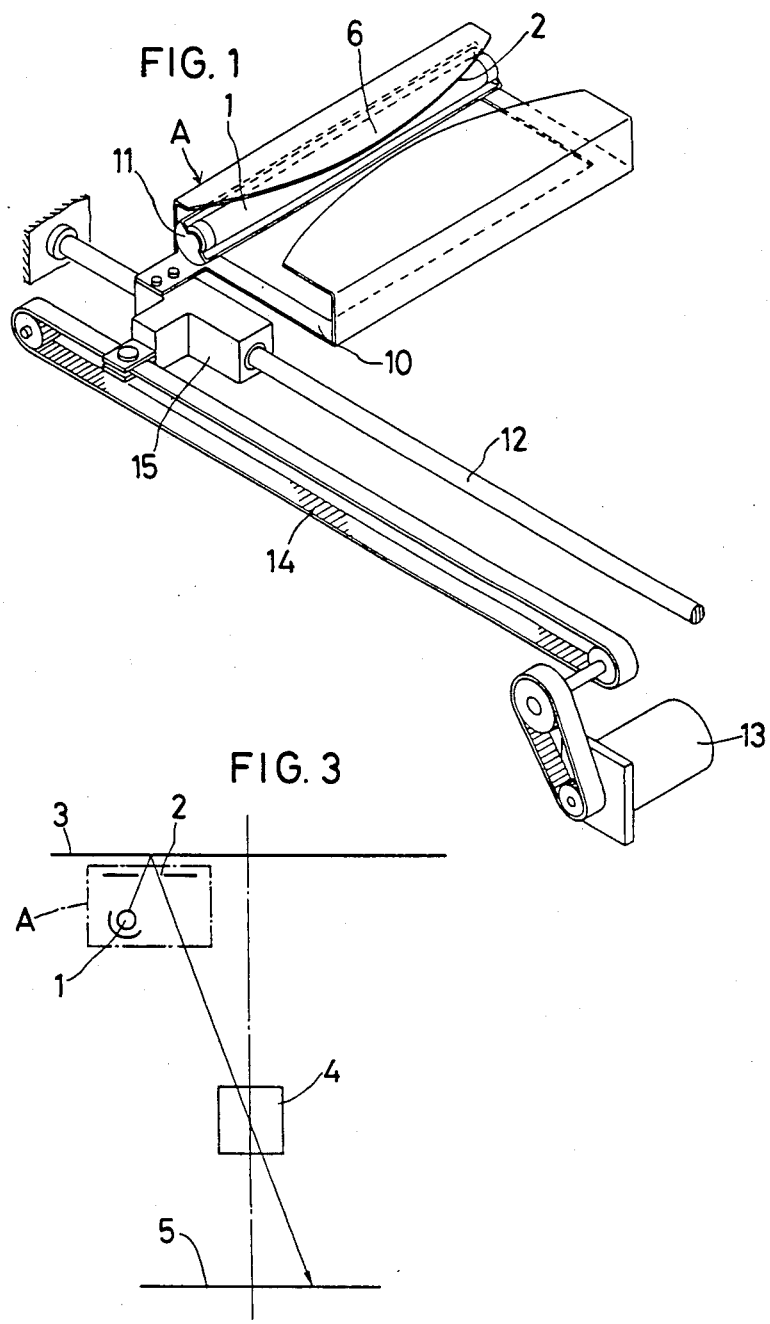

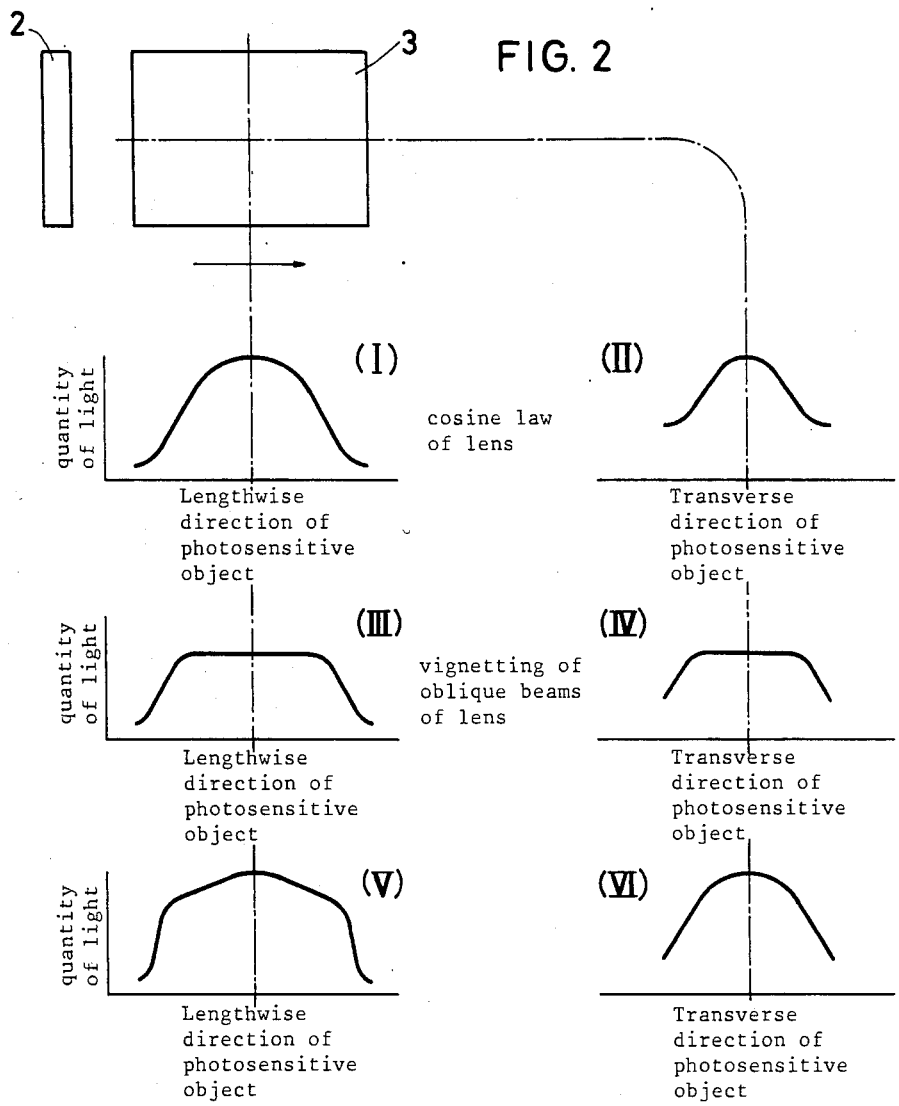

LIGHT SOURCE ASSEMBLY FOR USE WITH AN ELECTROPHOTOGRAPHIC COPYING APPARATUS

The present invention relates to a light source assembly for use with an electrophotographic copying apparatus for forming toner image on a photosensitive object.

In general, the electrophotographic process comprises the steps of, during the movement of a photosensitive object having a photoconductive layer on its surface, uniformly charging and then imagewise exposuring the object to form an electrostatic latent image thereon, and developing electrostatic latent images with a developer containing toner particles.

In the imagewise exposuring step for the electrophotograpic process, the most often used is what is called the scanning exposure method, in which during the movement of photosensitive object, either a light source and a focusing lens or the original to be copied is moved synchronously with the movement of the photosensitive object.

However, this method has a drawback that the image formed tends to blur due to difficulty of exact synchronization of movements between the movement of photosensitive object and either the movement of light source and focusing lens or the movement of the original to be copied, thus making it difficult to produce a sharp and high-resolution image. Especially in a color electrophotography in which scanning exposures are repeated a plurality of times to form a multi-color image, the abovesaid problem is serious and the solution has been acutely hoped.

In order to obtain a high quality image, the inventors took notice of the fact that the stationary exposure in which only the light source arranged near an original support is moved, while keeping stationary the original, the lens assembly and the photosensitive object, is possible without substantially increasing the power of the light source. As a result, we succeeded in solving the abovesaid resolution problem. But, another problem was left unsolved, namely a fogging at a peripheral portion resulting from an uneven distribution of light over the photosensitive object. This problem was particularly remarkable if a luminescent lamp such as a xenon lamp, a metal halide lamp or a fluorescent lamp is used as the light source.

It is an object of the present invention to provide a light source assembly for use with an electrophotographic copying apparatus which assures a uniform distribution of light over the surface of a photosensitive object in a rather simple manner to provide a high-quality image, in case the distribution of the intensity of illumination on the surface of the original is low at the peripheral portion.

In accordance with the present invention, a lamp unit is formed with a slit having its width being the narrowest at the center and gradually widening toward both ends and is speed controlled so as to move the fastest at the center of the original support and slower as it gets closer to both ends so that the surface of an original support is exposed to the least amount of light at its central portion and to the larger amount around its peripheral portion. This assures that the light reflected by the original and passed through a lens will be uniformly distributed over the photosensitive object on account of the vignetting of oblique beams of lens and according to the the cosine law.

Now it will be described in more detail how lights are distributed over the photosensitive object during the movement of a slit formed in a lamp unit, with reference to FIG. 2.

If a lamp unit A formed with a rectangular slit 2 for restricting the amount of light is moved over an original support 3 from one end thereof to the other end as shown by arrow in FIG. 2 at a constant speed, the distribution of light is as shown in FIGS. 2(I) through 2(IV), in which FIGS. 2(I) and 2(II) show light distribution according to the cosine law, while FIGS. 2(III) and 2(IV) show light distribution due to the vignetting of oblique beams of lens. FIG. 2(V) is a curve obtained by combining the distribution curve of FIG. 2(I) with that of FIG. 2(III), showing the distribution of light in the direction of movement of the slit. Similarly, FIG. 2(VI) is a curve obtained by combining the distribution curve of FIG. 2(II) with that of FIG. 2(IV), showing the distribution of light in the direction perpendicular to the direction of movement of the slit.

As is apparent from the graph of FIG. 2(V), the amount of light is low at the beginning and the end of travel of the slit. Also as shown in the graph of FIG. 2(IV), the amount of light is low at both sides of the slit in a direction perpendicular to the movement of the slit 2. Thus, as a whole, the photosensitive object is exposed to a smaller amount of light at its peripheral portion.

If the amount of light shed through the slit on the original support is increased at the peripheral portion of the original support as in the present invention to compensate for such uneven distribution as described above, the distribution of light will be flattened over the photosensitive object.

The present invention makes it possible to make uniform the distribution of light over the surface of a photosensitive object without the need of adjusting the distribution of light by use of a special means in the light source lamp or without incurring any increase in the capacity of light source. Thus according to this invention, a sharp and high-resolution copy without any blurring or fogging on the peripheral portion will be obtained. Also, this invention will be conveniently applied to the color electrophotography in which a photosensitive object is exposed to light a plurality of times to form a multi-color image of good pictorial quality, especially, if titanium dioxide is used as photoconductive layer in the photosensitive material sheet for a CPC (coated paper copier) system electrophotography.

Other features and objects of the present invention will become apparent from the following description taken with reference to the accompanying drawings, in which:

FIG. 1 is a perspective view of one embodiment of the assembly in accordance with the present invention;

FIGS. 2(I) to 2(VI) are graphs showing light distribution over the surface of a photosensitive object with a lamp unit formed with a rectangular slit; and FIG. 3 is a schematic view of an electrophotographic copying apparatus provided with the light source assembly of the present invention.

Referring to the drawings, FIG. 1 shows a lamp unit A comprising a carrier 10 and a light reflector 11 and a lamp 1 supported on the carrier 10. The lamp 1 has a length substantially equal to the width of an original support 3 shown in FIG. 3. The light from the lamp 1 passes through a slit 2 formed in a light shield 6 over the lamp so as to be shed on the original support 3.

The slit 2 is elongated along the lamp 1 with its width gradually widening from the center toward both ends.

The lamp unit A is movable along a guide rod 12 provided below the original support 3, driven by a pulse motor 13, from one end of the original support 3 to the other end. The lamp unit A is adapted to be accelerated on its way from the starting point toward the midpoint of the original support 3 and be decelerated thereafter toward the other end. This means that the lamp unit A is speed controlled so as to move fastest at the center of the original support 3 and the closer it comes to either end, the slower the speed.

In the preferred embodiment, the pulse motor 13 is used to drive an endless timing belt 14 which has one portion thereof coupled to a slide member 15 slidable along the guide rod 12. The slide member 15 is in turn coupled to the lamp unit A to drive the latter. But, it is to be understood that driving mechanisms of any other type may be used.

Since the lamp unit A is formed with the slit 2 having its central portion narrowed so that its width will gradually widen toward both ends, the amount of light radiated from the lamp 1 through the slit 2 on to the original support 3 is the least at its central portion in the direction of width and gradually increases toward both sides thereof. The distribution of light reflected by the support 3 and passed through a lens 4 is uniform over a photosensitive object 5 with respect to a direction perpendicular to the movement of the lamp unit because of the vignetting of oblique beams of lens and the cosine law.

Also since the lamp unit travels fastest at the center of the original support 3 and slower as it is closer to either end, the surface of an original support is exposed to the largest amount of light at both ends while exposed to the least amount at the center. Thus the light reflected by the original support 3 and passed through the lens 4 is distributed uniformly over the photosensitive object 5 with respect to the direction of travel of the lamp unit, too, because of the vignetting of oblique beams of lens and the cosine law.

The distribution of the amount of light shed over the photosensitive object 5 is uniform with respect to the direction of travel of the lamp unit as well as to the direction perpendicular to that of travel. Thus, since the surface of the photosensitive object 5 is irradiated with light evenly all over its surface, a clear image can be formed thereon by electrophotographic process.

What is claimed is:

1. A light source assembly for use in an electrophotographic copying apparatus for copying an image of an original on a photo sensitive object by illuminating said original placed on said electrophotographic copying apparatus, said light source assembly comprising:
    a carrier;
    a lamp held within said carrier;
    a shield provided on said carrier for adjusting a quantity of light emitted from said lamp, said shield being provided with a slit having a width which has a narrow clearance at the center thereof and gradual wide clearance toward both side ends thereof; and
    means for driving said carrier along said original in a manner such that the speed thereof is slower at the both ends of said original and faster at the middle of said original thereby producing a uniform quantity of reflected light upon said photosensitive object.

2. A light source assembly as claimed in claim 1, wherein said means comprises a guide rod along which said carrier moves.

3. A light source assembly as claimed in claim 1, wherein said means comprises an endless belt to which said carrier is attached.

4. A light source assembly as claimed in claim 1, wherein said means comprises a pulse motor.

* * * * *